United States Patent
Bertram et al.

(10) Patent No.: US 9,823,827 B2
(45) Date of Patent: *Nov. 21, 2017

(54) USER INTERFACE MODULE SHARING

(71) Applicant: International Business Machines Corporation, Armonk, NY (US)

(72) Inventors: Randal L. Bertram, Raleigh, NC (US); Keith D. Cramer, Pine Island, MN (US); Alejandro M. Ortiz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/834,763

(22) Filed: Aug. 25, 2015

(65) Prior Publication Data

US 2016/0110045 A1   Apr. 21, 2016

Related U.S. Application Data

(63) Continuation of application No. 14/515,571, filed on Oct. 16, 2014.

(51) Int. Cl.
*G06F 3/0484* (2013.01)
*G06F 15/16* (2006.01)
*G06F 9/44* (2006.01)

(52) U.S. Cl.
CPC ...... *G06F 3/04847* (2013.01); *G06F 3/04842* (2013.01); *G06F 8/34* (2013.01);
(Continued)

(58) Field of Classification Search
CPC ...... G06F 15/16; G06F 3/04847; G06F 15/00; G06F 3/04842; G09G 5/00; H04L 67/02; H04L 12/2809; H04L 41/0253; H04L 4/12

See application file for complete search history.

(56) References Cited

U.S. PATENT DOCUMENTS 5,596,702 A * 1/1997 Stucka ............... G06F 8/38
                                                                    715/746
5,928,323 A   7/1999 Gosling et al.
(Continued)

FOREIGN PATENT DOCUMENTS

WO   2012008755 A2   1/2012

OTHER PUBLICATIONS

SiSoftware Sandra, YouTube video, 1:08 to 1:26, downloaded from https://www.youtube.com/watch?v=1NWVsCkwdU4.*
(Continued)

*Primary Examiner* — Jennifer To
*Assistant Examiner* — Eric Yoon
(74) *Attorney, Agent, or Firm* — Matthew C. Zehrer

(57) ABSTRACT

A manager amongst numerous devices that serves as a manager or monitors another managed device. The managing device may queries the managed device to determine the functionality provided by, or requirements of, one or more managed device UIs. The managed device returns the functionality provided by or requirements of the managed device UI(s) to the managing device which, in turn, saves the information in a master UI function table. The managing device returns one or more UI modules to the managed device that are appropriate as based upon the received UI functionality or UI requirement information. The managing device may further assemble one or more UI modules that are appropriate as based upon the received UI functionality or UI requirement information and provide the assembled UI module to a user of the managing device.

4 Claims, 7 Drawing Sheets

(52) U.S. Cl.
CPC .............. *G06F 8/38* (2013.01); *G06F 9/4445* (2013.01); *G06F 15/16* (2013.01)

(56) References Cited

U.S. PATENT DOCUMENTS

| | | | | |
|---|---|---|---|---|
| 6,687,745 | B1* | 2/2004 | Franco | G06F 8/60 709/219 |
| 7,844,768 | B2 | 11/2010 | Tanaka | |
| 8,010,531 | B2* | 8/2011 | Ruiz-Velasco | H04L 12/4625 707/736 |
| 8,082,440 | B2 | 12/2011 | Merizan et al. | |
| 8,166,539 | B2 | 4/2012 | Pan | |
| 8,615,571 | B2 | 12/2013 | Bower, III et al. | |
| 2005/0060534 | A1 | 3/2005 | Marvasti | |
| 2008/0313545 | A1 | 12/2008 | Patel et al. | |
| 2009/0132942 | A1* | 5/2009 | Santoro | G06F 3/0481 715/765 |
| 2009/0210488 | A1 | 8/2009 | Lee | |
| 2010/0070566 | A1 | 3/2010 | Vandewalle | |
| 2010/0131854 | A1* | 5/2010 | Little | G06F 3/0486 715/735 |
| 2010/0262467 | A1* | 10/2010 | Barnhill, Jr. | H04L 12/2809 709/223 |
| 2011/0154462 | A1 | 6/2011 | Charbonnier et al. | |
| 2012/0299811 | A1 | 11/2012 | Amendolagine et al. | |
| 2014/0068453 | A1 | 3/2014 | Kominac et al. | |

OTHER PUBLICATIONS

J. Harmon, Dojo Using the Dojo Javascript Library to Build Ajax Applications, published 2009.*
"Using the IBM Flex System Chassis Management Module web interface", http://pic.dhe.ibm.com/infocenter/flexsys/information/index.jsp?topic=%2Fcom.ibm.acc.cmm.doc%2Fcmm_product_page.html, retrieved Apr. 26, 2014, © 2012.
"IBM PureFlex System Information", http://pic.dhe.ibm.com/infocenter/flexsys/information/index.jsp?topic=%2Fcom.ibm.acc.cmm.doc%2Fcmm_product_page.html, accessed Apr. 26, 2014., © 2012.
"Cúram Personalized Pod Page Configuration Guide", Version 6.0.4, Sections 2.2 to 2.3, accessed Apr. 26, 2014, © 2011.
"IBM Flex System Chassis Management Module User's Guide", accessed Apr. 26, 2014, © 2012, pp. 39-44.
IPCOM000014792D, "Method and Apparatus to Translate/Transcode Marked-Up Text in Real-Time Fashion", originally published as an IBM TDB, Apr. 22, 2001, republished electronically by ip.com, Jun. 20, 2003.
IPCOM000157397D, "Display UI of Standalone Java Applications on Remote Client Device", published Aug. 28, 2007.
V. Stirbu Nokia et al., "Widget Description Exchange Service (WIDEX) Requirements," WIDEX Internet-Draft, Jan. 8, 2007.
Thmmes et al., "RemoteUI: A High-Performance Remote User Interface System for Mobile Consumer Electronic Devices," Consumer Electronics, IEEE Transactions on vol. 58, Issue 3, 2012.
List of IBM Patents or Patent Applications Treated as Related.

* cited by examiner

USER INTERFACE MODULE SHARING

FIELD OF THE INVENTION

Embodiments of the invention generally relate to computer systems and more particularly to the sharing of a user interface module, such as a graphical user interface (GUI), across various computing devices.

DESCRIPTION OF THE RELATED ART

A user interface (UI) allows a user to interact with a computing or electronic data handling device. A particular UI is a graphical user interface (GUI) that allows users to graphically interact with one or more electronic devices. The use of GUIs is widespread. For example, GUIs are used in computers, tablet computers, mobile phones, portable media players, gaming devices, household appliances, cash machines, and office equipment to display various software applications. Software applications may include images and text that may be displayed via GUIs.

SUMMARY

In an embodiment of the present invention, a method of sharing user interface (UI) modules includes determining, with a managing device, a managed device currently managed or monitored by the managing device, requesting, with the managing device, from the managed device one or more UI requirements, determining, with the managing device, one or more UI modules that satisfy the one or more UI requirements of the managed device, delivering, with the managing device, the one or more UI modules that satisfy the one or more UI requirements of the managed device, assembling, with the managing device, the one or more UI modules, and providing, via a user interface of the managing device, the assembled UI module.

This and other embodiments, features, aspects, and advantages will become better understood with reference to the following description, appended claims, and accompanying drawings.

DETAILED DESCRIPTION

Embodiments of the invention relate to the sharing of or reuse of UI modules across multiple electronic devices. In an embodiment, a system utilizes a device hierarchy to establish an owner or manager amongst numerous devices that serves as a manager or provides a managerial function to another managed device. The managing device may query the managed device to determine the functionality provided by, or requirements of, one or more managed device UIs. The managed device may return the functionality provided by or requirements of the managed device UI(s) to the managing device which, in turn, saves the information in a master UI function table. The managing device may return one or more UI modules to the managed device that are appropriate as based upon the received UI functionality or UI requirement information. The managing device may further assemble one or more UI modules that are appropriate as based upon the received UI functionality or UI requirement information and provide the assembled UI module to a user of the managing device.

Figure 1:
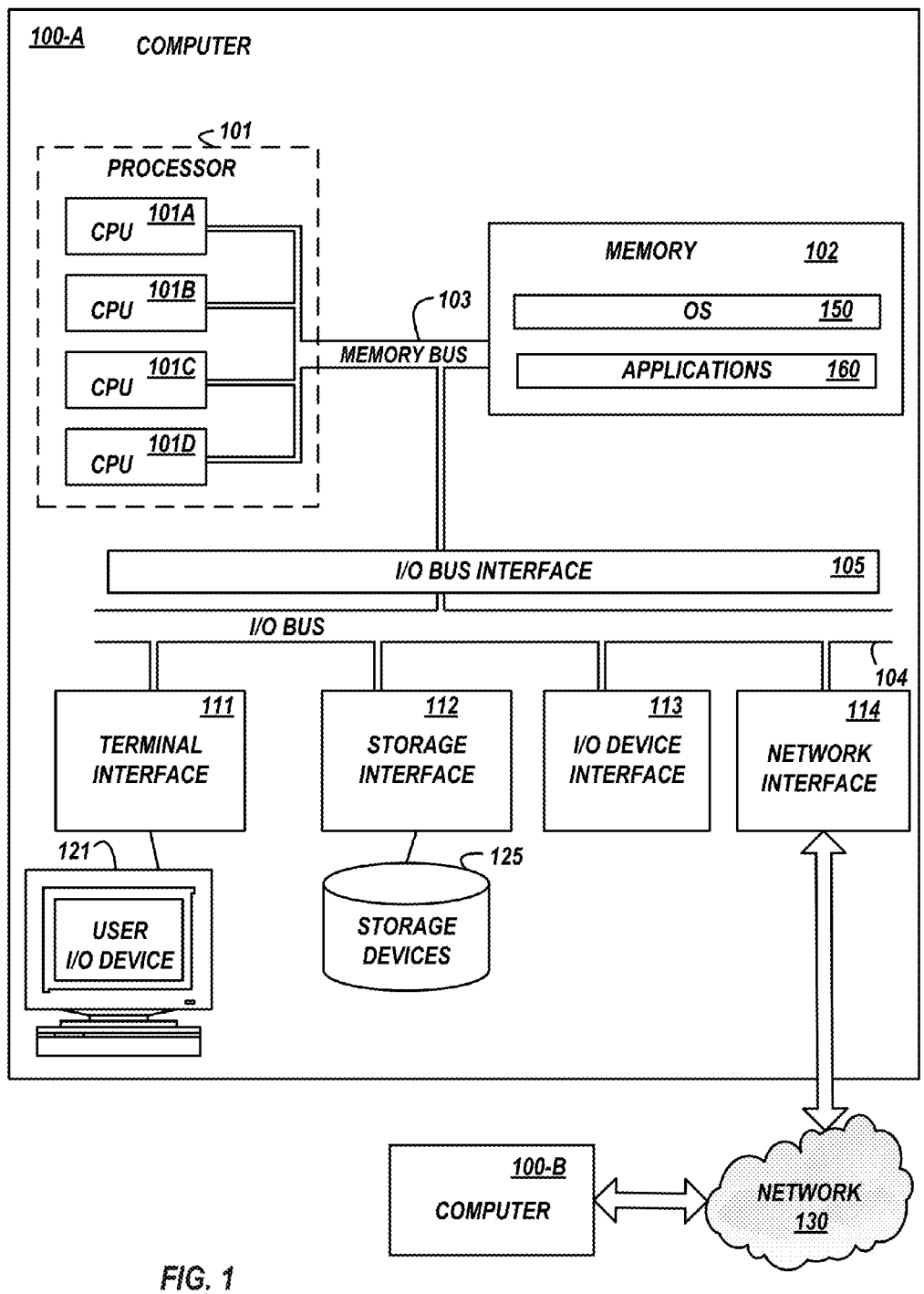
FIG. 1 illustrates a high-level block diagram of an exemplary computer system for implementing various embodiments of the invention.

Referring to the Drawings, wherein like numbers denote like parts throughout the several views, FIG. 1 depicts a high-level block diagram representation of a computer 100-A connected to another computer 100-B via a network 130, according to an embodiment of the present invention. The term "computer" is used herein for convenience only, and in various embodiments is a more general data handling system, such as a mobile phone, tablet, server computer, etc. The mechanisms and apparatus of embodiments of the present invention apply equally to any appropriate data handling system.

The major components of the computer 100 may comprise one or more processors 101, a main memory 102, a terminal interface 111, a storage interface 112, an I/O (Input/Output) device interface 113, and a network adapter 114, all of which are communicatively coupled, directly or indirectly, for inter-component communication via a memory bus 103, an I/O bus 104, and an I/O bus interface unit 105. The computer 100 contains one or more general-purpose programmable central processing units (CPUs) 101A, 101B, 101C, and 101D, herein generically referred to as the processor 101. In an embodiment, the computer 100 contains multiple processors typical of a relatively large system; however, in another embodiment the computer 100 may alternatively be a single CPU system. Each processor 101 executes instructions stored in the main memory 102 and may comprise one or more levels of on-board cache.

In an embodiment, the main memory 102 may comprise a random-access semiconductor memory, storage device, or storage medium for storing or encoding data and programs. In another embodiment, the main memory 102 represents the entire virtual memory of the computer 100, and may also include the virtual memory of other computer systems coupled to the computer 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The main memory 102 stores or encodes an operating system 150, an application 160, and/or other program instructions. Although the operating system 150, an application 160, etc. are illustrated as being contained within the memory 102 in the computer 100, in other embodiments some or all of them may be on different computer systems and may be accessed remotely, e.g., via the network 130. The computer 100 may use virtual addressing mechanisms that allow the programs of the computer 100 to behave as if they only have access to a large, single storage entity instead of access to multiple, smaller storage entities. Thus, while operating system 150, application 160, or other program instructions are illustrated as being contained within the main memory 102, these elements are not necessarily all completely contained in the same storage device at the same time. Further, although operating system 150, application 160, other program instructions, etc. are illustrated as being separate entities, in other embodiments some of them, portions of some of them, or all of them may be packaged together.

In an embodiment, operating system 150, an application 160, and/or other program instructions comprise instructions or statements that execute on the processor 101 or instructions or statements that are interpreted by instructions or statements that execute on the processor 101, to carry out the functions as further described below with reference to FIGs. When such program instructions are able to be run by the processor 101, such computer 100 becomes a particular machine configured to carry out such instructions. For example, instructions for a GUI application may be loaded upon one or more computers 100A that causes the computer 100A to display a GUI provided to a user to manage the computer 100A or to manage a network connected computer 100B.

One or more processors 101 may function as a general-purpose programmable graphics processor unit (GPU) that builds images (e.g. a GUI) for output to a display. The GPU, working in conjunction with one or more applications 160, determines how to manipulate pixels on e.g. display, touch screen, etc. to create a display image or user interface. Ultimately, the image (e.g. GUI, etc.) is displayed to a user. The processor 101 and GPU may be discrete components or may be integrated into a single component.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The I/O interface units support communication with a variety of storage and I/O devices. For example, the terminal interface unit 111 supports the attachment of one or more user I/O devices 121, which may comprise user output devices (such as a video display device, speaker, and/or television set) and user input devices (such as a keyboard, mouse, keypad, touchpad, trackball, buttons, light pen, or other pointing device). A user may manipulate the user input devices using a user interface, in order to provide input data and commands to the user I/O device 121 and the computer 100, and may receive output data via the user output devices. For example, a user interface may be presented via the user I/O device 121, such as displayed on a display device, played via a speaker, or printed via a printer. The user interface may be a user interface that provides content to a user visually (e.g. via a screen), audibly (e.g. via a speaker), and/or via touch (e.g. vibrations, etc.). In some embodiments, the computer 100 itself acts as the user interface as the user may move the computer 100 in ways to interact with, input, or manipulate computer 100 data.

The storage interface unit 112 supports the attachment of one or more local disk drives or secondary storage devices 125. In an embodiment, the secondary storage devices 125 are rotating magnetic disk drive storage devices, but in other embodiments they are arrays of disk drives configured to appear as a single large storage device to a host computer, or any other type of storage device. The contents of the main memory 102, or any portion thereof, may be stored to and retrieved from the secondary storage devices 125, as needed. The local secondary storage devices 125 have a slower access time than does the memory 102, meaning that the time needed to read and/or write data from/to the memory 102 is less than the time needed to read and/or write data from/to for the local secondary storage devices 125.

Figure 2:
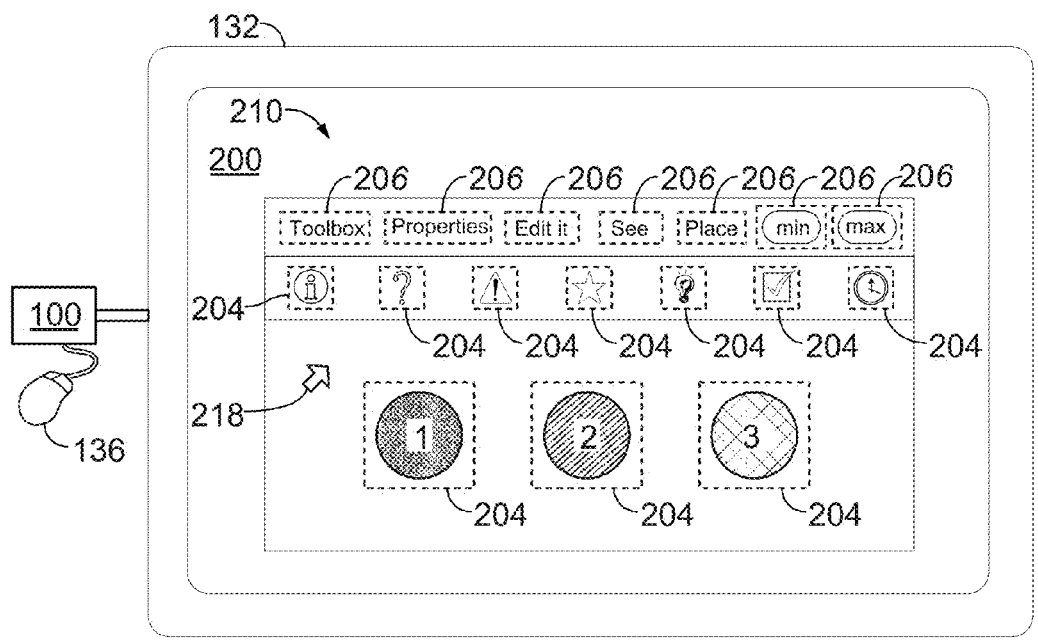
FIG. 2 and FIG. 3 illustrate exemplary GUI types, according to various embodiments of the present invention.

The I/O device interface 113 provides an interface to any of various other input/output devices or devices of other types, such as printers or fax machines. The network adapter 114 provides one or more communications paths from the computer 100 to other data handling devices such as numerous other computers; such paths may comprise, e.g., one or more networks 130. Although the memory bus 103 is shown in FIG. 2 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

I/O interface 113 may contain electronic components and logic to adapt or convert data of one protocol on I/O bus 104 to another protocol on another bus. Therefore, I/O interface 113 may connect a wide variety of devices to computer 100 and to each other such as, but not limited to, tape drives, optical drives, printers, disk controllers, other bus adapters, PCI adapters, workstations using one or more protocols including, but not limited to, Token Ring, Gigabyte Ethernet, Ethernet, Fibre Channel, SSA, Fiber Channel Arbitrated Loop (FCAL), Serial SCSI, Ultra3 SCSI, Infiniband, FDDI, ATM, 1394, ESCON, wireless relays, Twinax, LAN connections, WAN connections, high performance graphics, etc.

Though shown as distinct entities, the multiple I/O interface units 111, 112, 113, and 114 or the functionality of the I/O interface units 111, 112, 113, and 114 may be integrated into a similar device.

In various embodiments, the computer 100 is a multi-user mainframe computer system, a single-user system, a server computer, storage system, or similar device that has little or no direct user interface, but receives requests from other computer systems (clients). In other embodiments, the computer 100 is implemented as a desktop computer, portable computer, laptop or notebook computer, tablet computer, pocket computer, telephone, smart phone, pager, automobile, teleconferencing system, appliance, or any other appropriate type of electronic device.

The network 130 may be any suitable network or combination of networks and may support any appropriate protocol suitable for communication of data and/or code to/from the computer 100A and at least the computer 100B. In various embodiments, the network 130 may represent a data handling device or a combination of data handling devices, either connected directly or indirectly to the computer 100. In another embodiment, the network 130 may support wireless communications. In another embodiment, the network 130 may support hard-wired communications, such as a telephone line or cable. In another embodiment, the network 130 may be the Internet and may support IP (Internet Protocol). In another embodiment, the network 130 is implemented as a local area network (LAN) or a wide area network (WAN). In another embodiment, the network 130 is implemented as a hotspot service provider network. In another embodiment, the network 130 is implemented an intranet. In another embodiment, the network 130 is implemented as any appropriate cellular data network, cell-based radio network technology, or wireless network. In another embodiment, the network 130 is implemented as any suitable network or combination of networks. Although one network 130 is shown, in other embodiments any number of networks (of the same or different types) may be present.

FIG. 1 is intended to depict the representative major components of the computer 100. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations. The various program instructions implementing e.g. upon computer system 100 according to various embodiments of the invention may be implemented in a number of manners, including using various computer applications, routines, components, programs, objects, modules, data structures, etc.

Embodiments of the present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate exemplary architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 3:
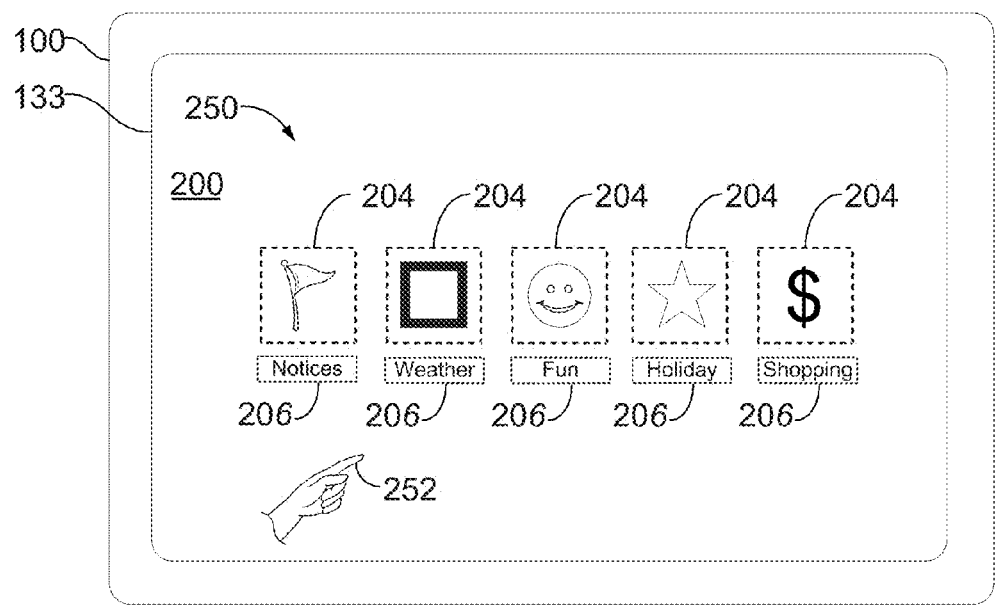

FIG. 2 and FIG. 3 illustrate exemplary GUIs 200, according to various embodiments of the present invention. GUI 200 may be generated by e.g. processor 101, GPU, etc. working in conjunction with applications 160, OS 150, etc. GUI 200 provides a graphical interface that is displayed upon, for example, display 132, touch screen display 133, etc. The user may interact with GUI 200 to e.g. manage computer system 100, to manage one or more devices in computer system 100, to manage, control, develop, create, utilize etc. one or more applications 160, OS 150, etc., manage one or more devices (e.g. computer system 100B) connected to computer system 100, etc., it being understood that GUI 200 may be utilized to accomplish many other functions upon or via computer system 100.

GUI 200 may visually present actions available to the user enabling user to interact with computer system 100. The user may interact via GUI 200 in a variety of ways, but generally the user interacts with GUI 200 by engaging image objects 204, textual objects 206, etc. How a user engages an image object 204 depends upon, for example, the particular image object 204, hierarchies, associations, or relationships that exist between multiple image objects 204, rules as defined by an application 160 associated with image objects 204, etc.

As shown in FIG. 2, GUI 200 may be a WIMP interface 210 (window, icon, menu, pointing device). When using a WIMP interface 210, the user utilizes, for example, a mouse or other handheld device 136 to control the position of cursor 218. In certain embodiments, the WIMP interface 210 presents information in a window and an icon based environment. The user may engage a particular image object 204 or text object 206 by maneuvering the device 136 to manipulate cursor 218 to the particular object (e.g. "hover", etc.). The user may further engage the device 136 (e.g. click, double click, etc.), etc.

As shown in FIG. 3, GUI 200 may be a gesture interface 250. Using gesture interface 250, the user may interact with computer system 100 by touching, with one or more fingers 252, touch screen display 133. Exemplary touch gestures are pointing, pinching, flicking, rotating, etc. More generally, the user may engage a particular image object 204 or text object 206 by utilizing gesture interface 250 to engage with the particular image object 204 or text object 206. Gesture interface 250 may be beneficial when computer system 100 is a smaller mobile device such as a tablet, PDA, or smart phone, due to screen size constraints.

GUIs 200 may include numerous views or pages that may include similar image objects 204 or text objects 206 relative to other pages. As such, typically there are numerous different image objects 204 and text objects included in the GUI 200 displayed via the processor 101, GPU, etc.

Figure 4:
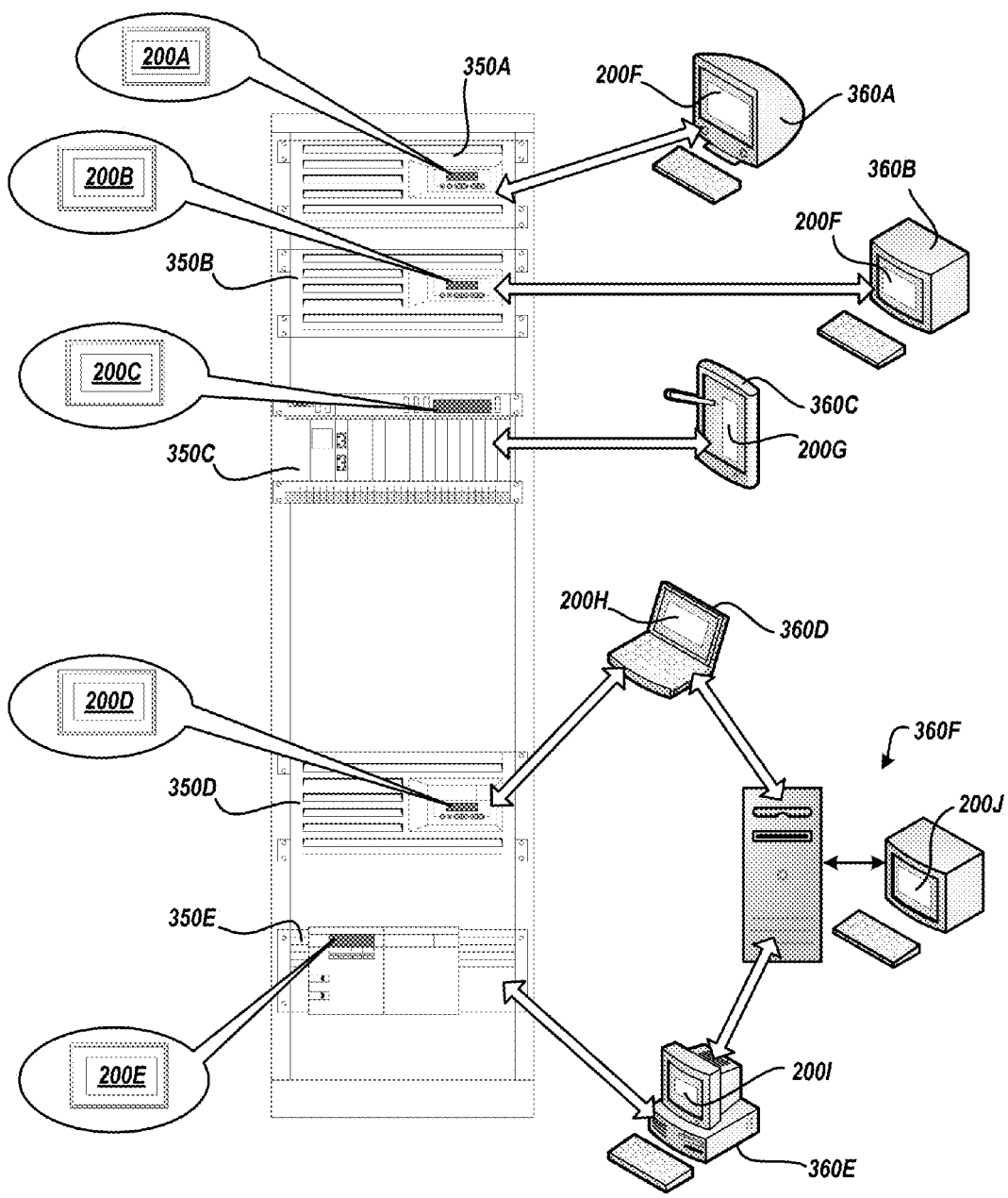
FIG. 4 illustrates a high-level block diagram of an exemplary computing system including devices that are managed via one or more managing device(s), according to various embodiments of the present invention.

FIG. 4 illustrates a high-level block diagram of an exemplary computing system that includes one or more managed devices 350 that are managed via one or more managing devices 360. In various embodiments, one or more UI modules may be shared by e.g., managing devices 360 with managed devices 350. By way of example, a GUI module may be shared by managing device 360 and managed device 350, it being understood that there are numerous other UI modules that may be shared. Further, the exemplary sharing of a GUI module is carried out throughout the remainder of this document.

In certain implementations, devices 350 each respectively include one or more GUIs 200 that may be utilized to e.g., manage the device 350, to manage one or more components in device 350, to manage, control, develop, create, etc. one or more applications 160, OS 150, etc. in device 350, etc. For example, device 350A may include a GUI 200A, device 350B may include a GUI 200B, device 350C may include a GUI 200C, device 350D may include a GUI 200D, and device 350E may include a GUI 200E.

Managing device 360 may also each respectively include one or more GUIs 200 that may be utilized to manage the device 360, to manage one or more components in device 360, to manage, control, develop, create, utilize etc. one or more applications 160, OS 150, etc. in device 360, etc. Further, the one or more GUIs of managing device 360 may also be utilized to manage the device 350, to manage one or more components in device 350, to manage, control, develop, create, utilize etc. one or more applications 160, OS 150, etc. in device 350, etc. For example, manager device 360A may includes a GUI 200F for managing device 350A, manager device 360B may include a GUI 200K for managing device 350B, and manager device 360C may include a GUI 200G for managing device 350C. In certain implementations a first manager device 360 may further be managed by a second manager device 360. In other words, a manager device 360 may also be a managed device 350.

For example, a manager device 360F may include a GUI 200J for managing device 360D, device 360E, device 350D, and/or device 350E.

As shown in FIG. 4, numerous devices within a computer system may include GUIs 200. Further, respective devices 350, managing devices 360, and/or respective GUIs 200 may be manufactured or implemented by heterogeneous manufacturers or generally utilize differing GUI modules that result in different GUI program instructions, different look and feel, etc. of the respective GUIs 200 included upon devices 360 and managed devices 350. As the number of devices 360, managed devices 350, and respective GUIs increase, the utilization the different GUIs becomes cumbersome and leads to a poor user experiences, even though many of the components and functions of the respective GUIs overlap.

Figure 5:
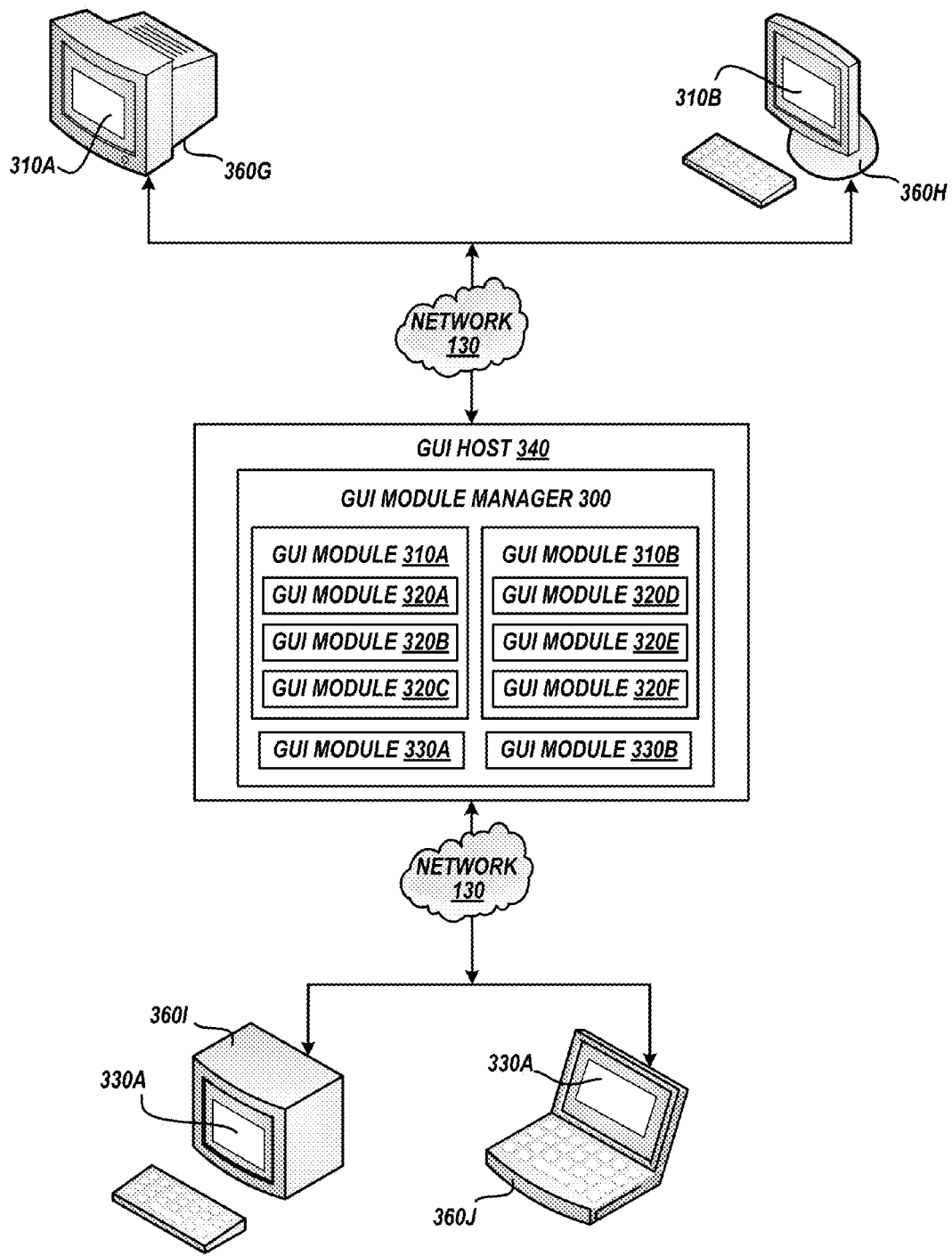
FIG. 5 illustrates a high-level block diagram of an exemplary system for sharing user interface modules within a computing system, according to various embodiments of the present invention.

FIG. 5 illustrates a high-level block diagram of an exemplary system for sharing user interface modules within a computing system, according to various embodiments of the present invention. A computing system may include a GUI host 340, one or more managing devices 360, and one or more devices 350 managed by the one or more managing devices 360.

GUI host 340 (e.g. computer 100, etc.) owns or otherwise controls a particular GUI application that may be shared with devices 350 and/or devices 360 and may also be referred to as the owning device. GUI host 340 may be communicatively connected to devices 350 and devices 360 (directly or indirectly) via a network 130, cabled connection, etc. GUI host 340 may includes a GUI module manager 300 that stores one or more GUI modules. GUI module manger 300 may be electronic circuitry, programmable logic circuitry, FPGA, PLA, processor 101, etc. that implements associated program instructions corresponding to applicable functionality as described herein.

GUI modules are generally program instructions utilized by e.g. processor 101, GPU to display a GUI, a segment of a GUI, etc. GUI modules may be an entire GUI application or may be segments of an entire GUI application. In certain embodiments, a GUI module may be a grouped GUI module 310 that includes one or more GUI modules 320. In other embodiments, a GUI module may be an independent GUI module 330. GUI modules are generally sharable such that e.g., a managing device 360 or a managed device 350 may obtain one or more GUI modules from the GUI host 340, a managed device 350 may obtain one or more GUI modules from managing device 360, etc. Thus, according to various embodiments, GUI modules may be reused across multiple devices.

In embodiments, a GUI module may be loaded upon GUI host 340 being pre-associated with one or more devices 350, 360. For example, if GUI host 340 is embodied as a cloud manager, there may be numerous identical or similar cloud devices (e.g. servers, hardware management consoles, etc.) within the cloud network wherein the pre-associated GUI modules may be provided to the cloud devices via the GUI host 340.

In embodiments, a multiple similar GUI modules (e.g. similar tasks may be accomplished, similar functionality, etc.) may be loaded upon GUI host 340 each respectively being associated with a generic parameter(s) or range of parameters of a device 350, 360. For example, a first GUI module associated with a small screen size may be stored upon GUI host 340, a second GUI module associated with a large screen size may be stored upon GUI host 340, and a third GUI module associated with an extra-large screen size may be stored upon GUI host 340.

In certain embodiments, as shown in FIG. 5, managing device 360 obtains GUI modules and acts as a proxy for distributing applicable GUI modules to each managed device 350 under its management. For example, managing device 360G obtains a GUI module 310A from GUI host 340 that includes GUI module 320A-320C in order to provide a GUI, managing device 360H obtains a GUI module 310B from GUI host 340 that includes GUI modules 320D-320F in order to provide a GUI, managing device 360I obtains a GUI module 330A from GUI host 340 in order to provide a GUI, and managing device 360J obtains a GUI module 330A from GUI host 340 in order to provide a GUI. In other embodiments, as opposed to receive GUI modules from GUI host 340, managing device 360 may obtain one or more GUI modules from another managing device 360, a managed device 350, or the GUI modules may be preloaded upon the managing device 360.

Figure 6:
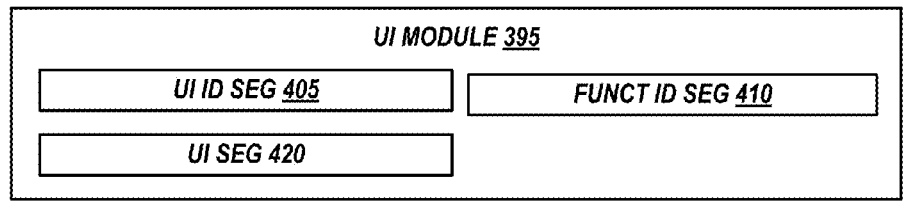
FIG. 6 illustrates a high level block diagram of an exemplary sharable UI module, according to various embodiments of the present invention.

FIG. 6 illustrates a high level block diagram of an exemplary sharable UI module 395. In embodiments, a UI module 395 may include a UI type segment 405 that generally identifies the type of UI of module 395 (e.g. GUI, hardware UI associated firmware, etc.). The UI module 395 may further include a UI function segment 410 that generally identifies the functionality of the UI module 395. For example, function segment 410 may indicate that UI module 395 is a graphical hardware view of a specific machine type to control hardware provisioning, implementation of virtual machines, etc. Further, the UI module 395 may also include a UI segment 420 that is generally the functional program instructions of the UI module 395 that e.g., may be invoked by processor 101 to carry out the function or task of the UI module 395.

Unless otherwise utilized herein, a UI module is program instructions associated with a user interface of a computing or data handling device. For example, the UI module may be program instructions associated with e.g., a direct manipulation interface, GUI, web user interface, touch screen interface, hardware interfaces such as knobs, buttons, sliders, switches, etc., gesture interface, user motion tracking interface, multi-screen interface, text-based interface, voice interface, natural-language interface, zero-input interface, etc.

In certain embodiments, efficient UI module version managed may be provided. For example, a first UI module may be a most recent version of a GUI application segment and a second UI module may be a down level version of the GUI application segment. The managing device 360 may provide the first UI module to a first managed device 350 that is newly under management while maintaining the provision of the second UI module to a second managed device 350 that was previously under management. In other words, the first UI module and the second down level UI module may be provided simultaneously even though they are at different version levels. Therefore, managing device 360 may provide the newest functionality of an upgrade of a particular managed device 350, without forcing or destabilizing all the other managed devices 350 with, an experimental or untested UI module update.

Figure 7:
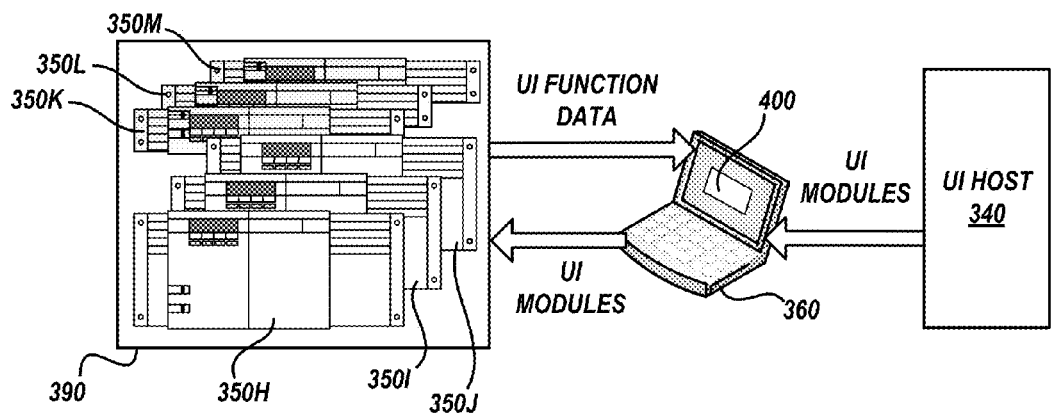
FIG. 7 illustrates a high level block diagram of an exemplary computing system for determining appropriate UI modules, sharing those UI modules, and providing those UI modules, according to various embodiments of the present invention.

FIG. 7 illustrates a high level block diagram of an exemplary computing system for determining appropriate GUI modules, sharing those GUI modules, and providing those GUI modules, according to various embodiments of the present invention.

In certain embodiments, subsequent to a managing device 360 obtaining one or more GUI modules, the managing device 360 may query each managed device 350 and receive functionality needs of a GUI for respective one or more managed device 350 user interfaces. The managing device 360 may store each respective managed device 350 functionality needs in a functionality table e.g., stored in memory 102, storage device 125, etc. The managing device 360 may determine respective GUI modules that satisfy the functionality needs for each respective managed device 350. If the determined GUI modules are not locally accessible to the managing device 360, the managing device may request needed GUI modules from e.g., GUI host 340. The managing device 360 may assemble the GUI modules and provide the assembled GUI modules to a user of the managing device. For example, the managing device 360 may assemble GUI modules associated with a plurality of managed devices 350 to graphically display a hardware view of the plurality of managed devices. Further, the managing device 360 may share or deliver the appropriate GUI module to each respective managed device 350.

For example, a computing system 390 includes managed devices 350H-350M. Managing device 360 receives UI function requirement data from respective managed devices 350H-350M that require one or more UI modules. Upon receipt of the UI function data, the managing device obtains (i.e. locally or via the UI host 340) UI modules that satisfy each UI function requirement for the respective managed devices 350H-350M. The managing device 360 may assemble UI modules associated with a plurality of managed devices 350 to graphically display a hardware view management GUI 400 displaying the plurality of managed devices. Further, the managing device 360 may share or deliver the appropriate GUI module to each respective managed device 350H-350M.

In particular implementations, various devices 350, 360 may be embodied as a chassis management module (CMM) web server, a device management console (DMC) that manages a device, and a multi-device management console (MMC) that manages the device and other devices. It may be determined, set, or otherwise indicated that the CMM owns a hardware view GUI module that may be stored upon the on the CMM web server, and is responsible for displaying hardware representations of various devices and allowing the user to interact with the devices and components thereof. In this manner the CMM may further function as the GUI host 340.

When the DMC or MMC determines it is responsible for managing the particular device, the DMC or MMC may download one or more applicable GUI modules from the CMM. This allows the DMC or MMC to use the graphical hardware view function to display all the devices under management, devices within a rack, a single device, etc. Then, the CMM may act as the proxy to send information back and forth between the DMC and MMC.

This implementation, along with various embodiments, allows the GUI module to be packaged sent to any managed device 350, managing device 360, etc., dynamically at run-time while avoiding GUI program instruction duplication.

In certain implementations, the GUI modules may be embodied by UI widgets (e.g. dojo widget coded in JavaScript, HTML files, CSS files, JQuery files, AngularJS files, etc.) that can be copied, swapped, moved, etc. dynamically. These widgets may communicate with devices using a representational state transfer (REST) application programming interface (API). This allows the widgets to be implemented in any device. Then, to communicate back and forth, the widgets attempt to send and receive data using REST uniform resource locators (URLs). Since URLs can be accessed using relative paths, the widgets may be implemented in multiple consoles simultaneously. Finally, each device may have a master Proxy Rest servlet. If this servlet receives a request for a URL and it detects it is not a function that it provides, it looks up the mapping for that function and proxies the request to the device that provides the function. A device can then use another device's widgets and function when both devices expose the set of functions each console is responsible for, etc. Dojo widgets are program instruction components including Java Script code, HTML markup, and Cascading Style Sheets style declarations that provide multi-browser interactive features such as menus, tabs, tooltips, sortable tables, dynamic charts, 2D vector drawings, animated effects (e.g., fades, wipes and slides), facilities for custom animation effects, etc.

With regard to a device displaying management GUI 400, a user may initially logs in to MMC. As part of the setup, the user may enter the IP addresses and credentials of the CMM that it wishes the MMC to manage and or monitor. During the credentialing process, the CMM returns a list of functions it provides and the graphical hardware views needed or utilized. The MMC may use the respective function lists to update its master table of functions. The CMM may also send which UI widgets are required to display the UIs for each function (e.g. including javascript files, dojo widgets, HTML template files, Style sheet files (CSS), image files, etc. In certain implementations, the MMC may receive one module per function or the MMC may receive multiple modules per function. Further, the MMC may assemble the modules that satisfy the required functions of the CMMs or as identified and provide the assembled UI to a user via a user interface of the MMC, CMM, etc.

The MMC may instantiate the UI widget it received from respective CMMs. In the present instance of multiple CMMs, the MMC assembles the different parameters from each CMM to be used in the multiple device display. When the UI widgets attempt to load the data required to render, and to also send data initiated by user interaction of GUI 400, the UI widgets use the relative URI for the REST API. Since they are running on the MMC, the UI widgets reach the MMC REST proxy that checks the function table to determine that it is managed by the MMC and routes the request to each CMM, waits for a response, and then returns the response to the applicable device managed by the MMC.

Figure 8:
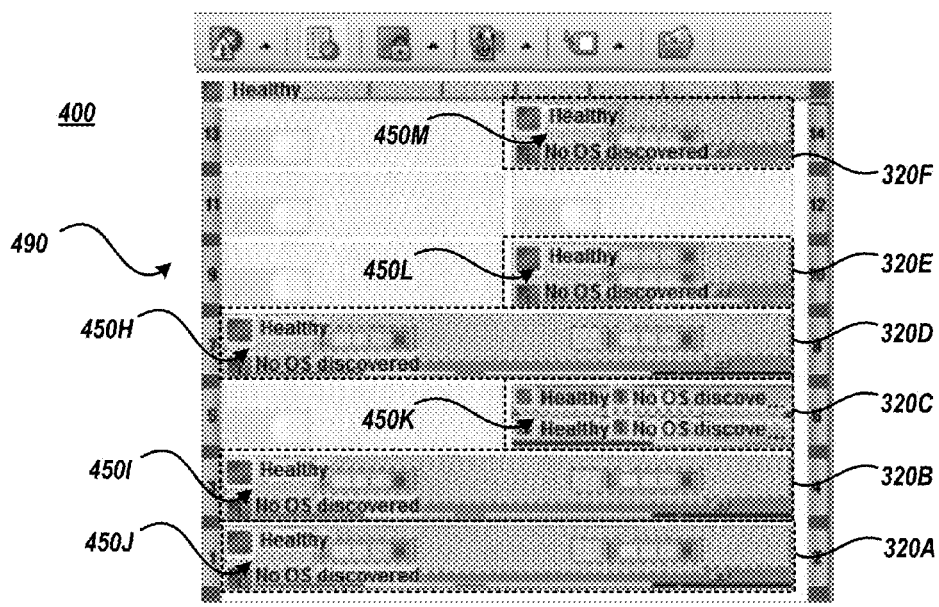
FIG. 8 illustrates an exemplary GUI assembled from sharable GUI modules and provided via a managing device interface, according to various embodiments of the present invention.

FIG. 8 illustrates an exemplary management GUI 400 assembled from sharable GUI modules and provided via a managing device 360 interface. GUI 400 displays a hardware management view 490 of e.g., computing system 390. The GUI 400 is assembled by e.g., managing device 360 subsequent to managing device 360 receiving UI function requirement data from respective managed devices 350H-350M and the managing device obtaining (i.e. locally or via the UI host 340) the UI modules that satisfy each UI function requirement. The managing device 360 assembles the UI modules associated with a plurality of managed devices 350. For example, managing device obtains and assembles GUI modules 320A-320F respectively associated with managed devices 350H-350M to display hardware view 490. Thus hardware view 490 may include hardware views 450H-450M of each managed device 350H-360 managed by managing device 360. In further embodiments, the managing device 360 may share or deliver the appropriate GUI module 320A-320F to each respective managed device 350H-350M for the presentation or display upon a UI.

Figure 9:
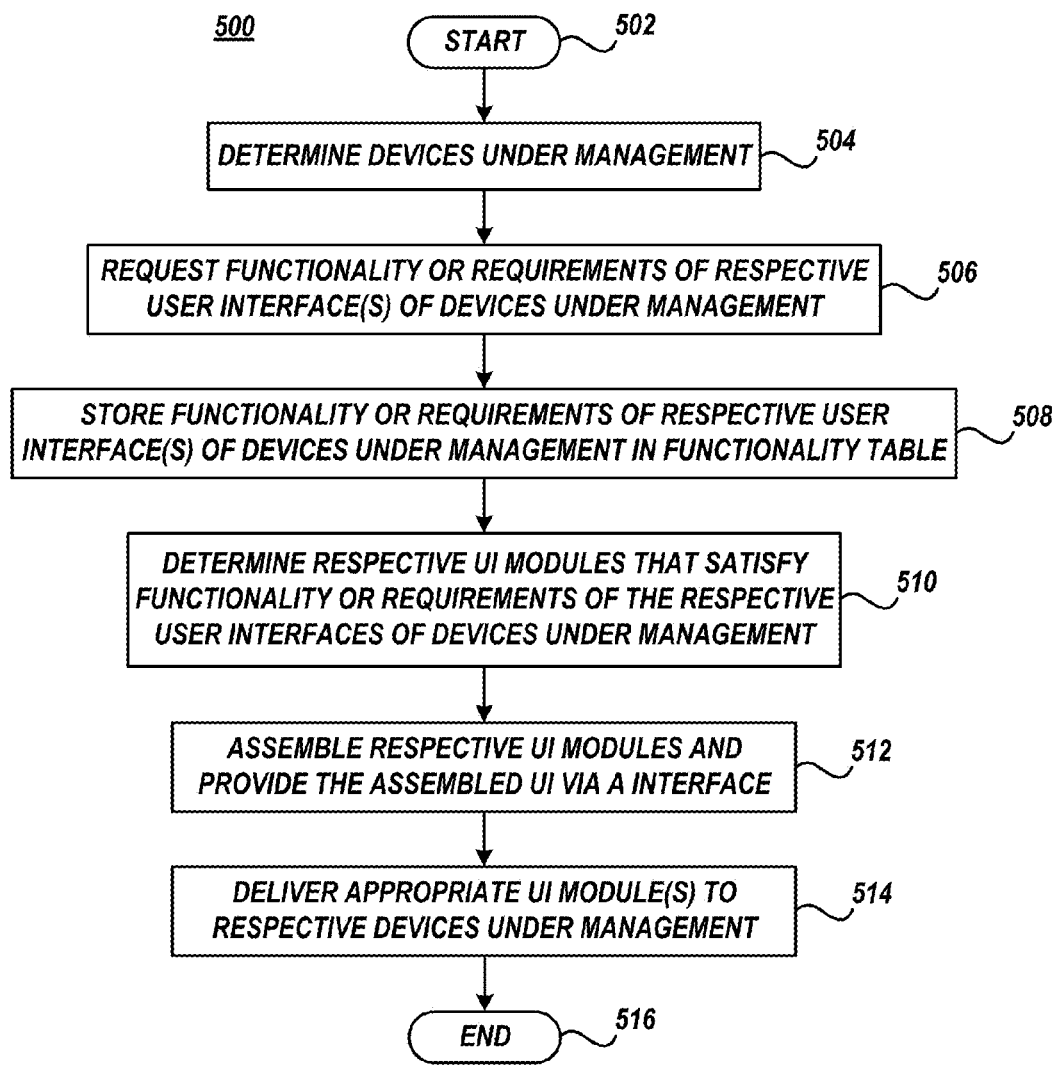
FIG. 9 illustrates an exemplary process for determining appropriate UI modules, sharing the UI modules, and/or providing the UI modules, according to various embodiments of the present invention.

FIG. 9 illustrates an exemplary process 500 for determining appropriate UI modules, sharing the UI modules, and/or providing the UI modules, according to various embodiments of the present invention. Process 500 may be utilized by e.g., managing device 360 within a computing system that at least includes the managing device 350 and one or more managed devices 340. Process 500 begins at block 502 and continues with determining devices 350 under management (block 504). For example, a user of managing device 360 may instruct of otherwise identify the devices 350 to be managed by managing device 360.

Process 500 may continue with requesting the functionality or requirements of respective UIs of each managed device 350 (block 506). For example, the managing device may query the managed device 350 of needed GUI modules so that the device 350 may provide a GUI via one or more user interfaces. The managed device 350 may return the requisite functionality or needed GUI modules to the managing device 360.

Process 500 may continue with the managing device 360 storing the returned functionality, requirements, or needed GUI modules of each device 350 under management in a functionality associated with (e.g. stored within, accessible by, etc.) managing device 360 (block 508).

Process 500 may continue with determining (e.g. requesting, identifying, etc.) respective one or more UI modules that satisfy the requisite functionality, requirements, etc. as requested by managed devices 350 (block 510). For example, managing device 360 may identify UI modules that are stored locally needed or otherwise requested by the managed devices 350 and/or managing device 360 may obtain UI modules that will satisfy the needs of respective managed devices 350 from a UI host 340.

Process 500 may continue with assembling the determined modules that satisfy the requisite functionality, requirements, etc. as requested by managed devices 350 and providing the assembled UI modules via a user interface (block 512). For example, the managing device assembles a first GUI module for a first managed device 350 and assembles a second GUI module for a second managed device 350 and displays the assembled GUI module upon the managing device 360 display.

Process 500 may continue with delivering each respective module that satisfy the requisite functionality, requirements, etc. to the requesting managed device 350 (block 514). For example, the managing device 360 may deliver the first GUI module to the first managed device and may deliver the second GUI module to the second managed device so that each managed device 350 may provide the UI upon the associated managed device 350 interface. Process 500 ends at block 516.

Figure 10:
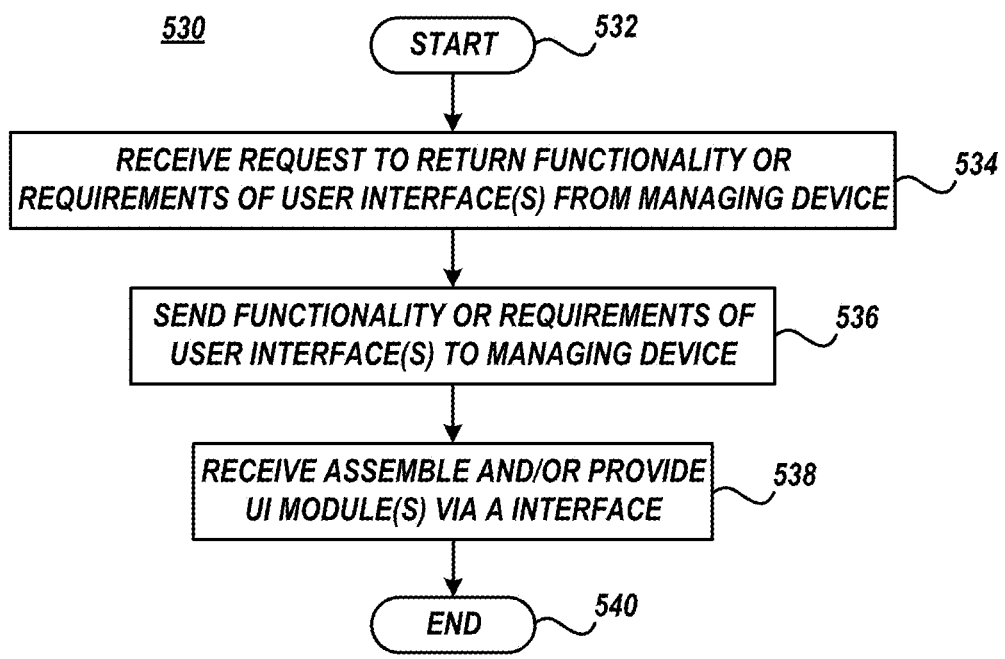
FIG. 10 illustrates an exemplary process for receiving sharable UI modules, according to various embodiments of the present invention.

FIG. 10 illustrates an exemplary process 530 for receiving sharable UI modules, according to various embodiments of the present invention. Process 530 may be utilized by e.g., managed device 350 that is managed or otherwise monitored by managing device 360.

Process 530 begins at block 532 and continues with receiving a request to return functionality, requirements, or needed UI modules, for one or more user interfaces from managing device 360 (block 534). Process 530 may continue with sending the requisite functionality, requirements, needed GUI modules, etc. to managing device 360 and may continue with receiving one or more UI modules from managing device 360 that satisfy the requisite functionality, requirements, or needed GUI modules. Process 530 ends at block 540.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over those found in the marketplace, or to enable others of ordinary skill in the art to understand the embodiments disclosed herein.

What is claimed is:

1. A method of sharing user interface (UI) modules within a system comprising a managing device, managed devices, and a UI host device, the method comprising:

determining, with a managing device, a first managed device and second managed device amongst a plurality of devices that are currently managed by the managing device;

requesting, with the managing device, from the first managed device UI requirements of the first managed device, wherein at least one UI requirement of the first managed device indicates a size of a display of the first managed device;

requesting, with the managing device, from the second managed device UI requirements of the second managed device, wherein at least one UI requirement of the second managed device indicates a size of a display of the second managed device;

receiving, with the managing device from the first managed device, UI requirements of the first managed device;

receiving, with the managing device from the second managed device, UI requirements of the second managed device;

storing, with the managing device, the UI requirements of the first managed device and the UI requirements of the second managed device within a master UI function table, wherein the master UI function table comprises respective received UI requirements of the plurality of devices that are currently managed by the managed device;

determining, with the managing device, one or more first UI modules that satisfy the UI requirements of the first managed device;

determining, with the managing device, one or more second UI modules that satisfy the UI requirements of the second managed device;

obtain, with the managing device, the one or more first UI modules and the one or more second UI modules from the UI host device;

delivering, with the managing device, the one or more first UI modules to the first managed device;

delivering, with the managing device, the one or more second UI modules to the second managed device;

providing, with the first managed device, the one or more first UI modules via a user interface upon the display of the first managed device;

providing, with the second managed device, the one or more second UI modules via a user interface upon the display of the second managed device;

assembling, with the managing device, the one or more first UI modules and the one or more second UI modules into an assembled UI module, and;

providing, with the managing device, respective hardware views of the first managed device and the second managed device within a hardware view UI upon a display of the managing device, wherein the hardware view UI utilizes the assembled UI module to display the one or more first UI modules and the hardware view of the first managed device within a shared first visual area within the hardware view UI and to display the one or more second UI modules and the hardware view of the second managed device within a shared second visual area within the hardware view UI.

2. The method of sharing UI modules of claim 1, wherein the one or more first UI modules and the one or more second UI modules are segments of respective graphical user interface (GUI) applications.

3. The method of sharing UI modules of claim 2, wherein the display of the managing device is a touch screen.

4. The method of sharing UI modules of claim 2, wherein the one or more first UI modules and the one or more second UI modules are dojo widgets.

* * * * *